Jan. 20, 1953     R. D. KISBEY     2,626,019
BRAKE UNIT

Filed July 16, 1951                               3 Sheets-Sheet 1

INVENTOR
Roy D. Kisbey
BY
ATTORNEYS

Jan. 20, 1953  R. D. KISBEY  2,626,019
BRAKE UNIT

Filed July 16, 1951  3 Sheets-Sheet 2

INVENTOR
Roy D. Kisbey
BY
ATTORNEYS

Jan. 20, 1953   R. D. KISBEY   2,626,019
BRAKE UNIT

Filed July 16, 1951   3 Sheets-Sheet 3

INVENTOR
Roy D. Kisbey
BY
ATTORNEYS

Patented Jan. 20, 1953

2,626,019

UNITED STATES PATENT OFFICE 2,626,019

BRAKE UNIT

Roy D. Kisbey, San Francisco, Calif.

Application July 16, 1951, Serial No. 236,900

14 Claims. (Cl. 188—90)

This invention relates to, and it is a main object to provide, an improved hydraulic brake unit especially designed—but not limited—for use on motor vehicles.

A further object of the invention is to provide a hydraulic brake unit which is self-contained; i. e. requires no hydraulic pressure supplied from exteriorly of the brake unit, and the latter is controlled by mechanical movement of a projecting rotary part connected to brake pedal actuated linkage of the vehicle.

A still further object of the invention is to provide the brake unit with a novel mechanically controlled, releasable holding brake or lock which is operative to prevent the relative rotatable parts of the brake unit from turning after they become static.

An additional object of the invention is to provide a self-contained brake unit as above which is sealed against water and dust entry, thus being of especial advantage on vehicles subject to travel under severe weather or road conditions.

Another object of the invention is to provide a brake unit which is smooth but positive and fast acting in operation; the brake unit running cool, and being subject to a minimum of wear and tear even under severe usage.

It is also an object of the invention to provide a brake unit which is designed for ease and economy of manufacture.

It should also be noted that while the device has been initially designed for braking purposes and is hereinafter so described, said device may also, of course, be adapted to serve as a clutch or driving unit if desired.

Still another object of the invention is to provide a practical and reliable brake unit, and one which will be exceedingly effective for the purpose for which it is designed.

These objects are accomplished by means of such structure and relative arrangement of parts as will fully appear by a perusal of the following specification and claims.

Figure 1:
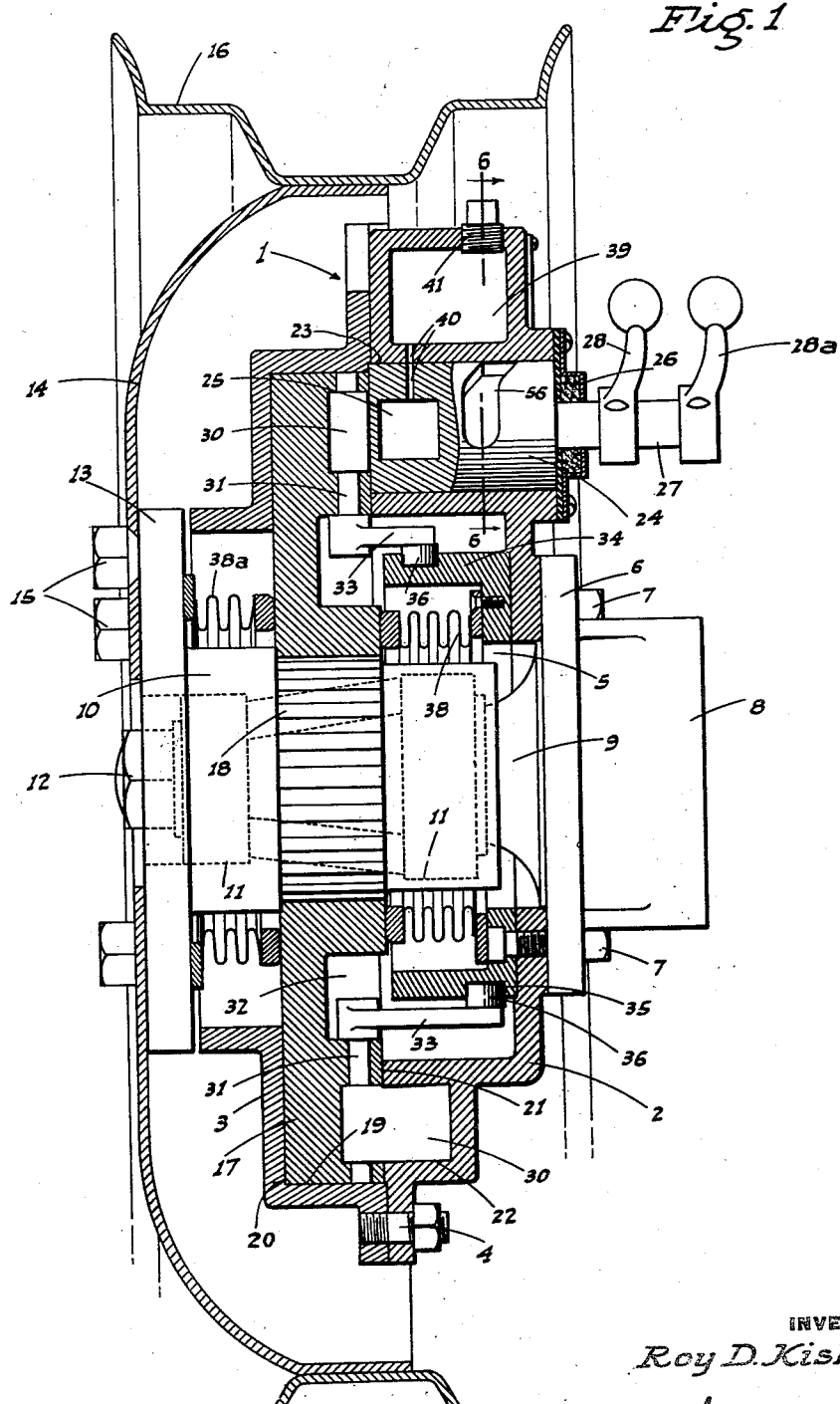
Fig. 1 is a transverse vertical section of the brake unit.
Figure 2:
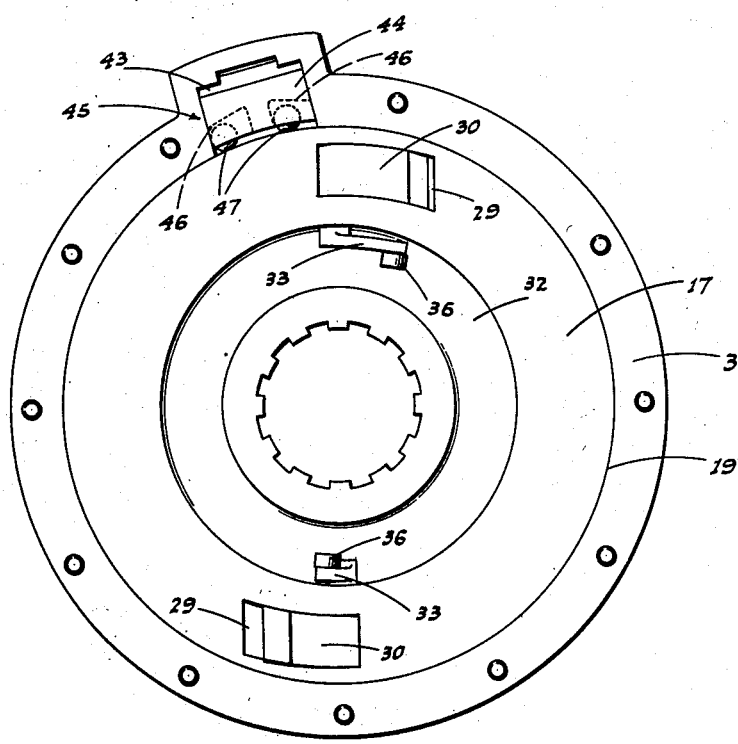
Fig. 2 is an end elevation of the outer annular body section showing the rotor therein; such section being detached from the inner body section.

Referring now more particularly to the characters of reference on the drawings, the novel brake unit comprises a fixed, circular body unit, indicated generally at 1; such body unit 1 including an inner, annular body section 2, and an outer, annular body section 3. The body sections 2 and 3 are secured together in matching relation at the periphery by bolts 4.

The body unit 1 includes a central opening 5 extending axially therethrough, and at its inner end said body unit 1 is secured—adjacent said opening— to a mounting disc 6 by means of bolts 7. The mounting disc 6 is substantially vertical, and is included—in integral relation—with a steering knuckle part 8; the brake unit here being illustrated as mounted in connection with the front wheel assembly of a motor vehicle. Such front wheel assembly includes a spindle 9 which projects axially outwardly from the center of the mounting disc 6, and a cage 10 is journaled on the spindle 9 by means of axially spaced bearings 11 held in place by a retention nut 12 threaded onto the outer end of said spindle.

At its outer end the rotary cage 10 is fitted with a wheel attachment disc 13 to which the face of a wheel 14 is removably secured by bolts 15; the wheel including a rim 16 which surrounds the fixed body unit 1 in spaced but protective relation.

A heavy-duty circular rotor 17 is mounted on the cage 10 by a spline connection 18; such rotor 17 being of substantial diameter and thickness, and running with a close fit at the periphery in a circular bore or way 19 formed in the outer body section 3. Such rotor is engaged, on opposite faces of its radially outermost portion, by adjacent and corresponding portions of the body sections 2 and 3, with the lines of engagement as at 20 and 21, respectively.

Axially inwardly of the radially outermost portion of the rotor 17, the inner body section 2 is formed with a full-circle passage or groove 22 concentric to the axis of the brake unit. At the uppermost point therein such passage is intersected by a circular bore 23 whose axis is parallel to that of the rotor; such bore extending through the inner body section 2 from face to face thereof.

A rotary plug valve 24 is engaged, with a running fit, in the circular bore 23, and such valve is formed with a diametral valve passage 25.

The rotary plug valve 24 is maintained in the circular bore 23 by means of a combination seal and retainer 26 secured exteriorly to the inner body section 2. A stub shaft 27 projects axially from the rotary plug valve 24 through the combination seal and retainer 26 to a termination exteriorly of the latter. At its outer or projecting end the stub shaft 27 is fitted with a radial arm 28 adapted to be connected to the brake pedal actuated linkage (not shown) of the vehicle. It is understood, however, that upon the brake pedal linkage being actuated, the radial arm 28 is swung in one direction or the other to rotate the plug valve 24 to an extent sufficient to partially or wholly close the valve passage 25 with respect to the groove 22; such passage normally being open relative to, or in communication with, said groove. The purpose of this arrangement will hereinafter appear.

Figure 4:
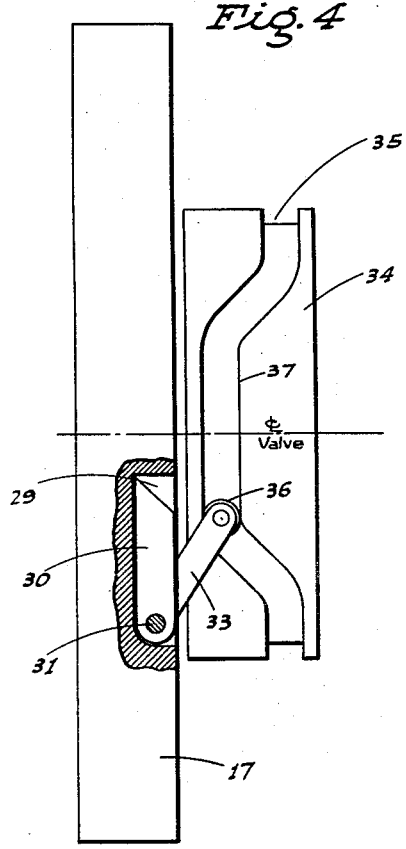
Fig. 4 is a diagrammatic elevation of the rotor and the impeller vane actuating cam assembly; the vane shown in the view being in its retracted, out-of-the-way position.
Figure 5:
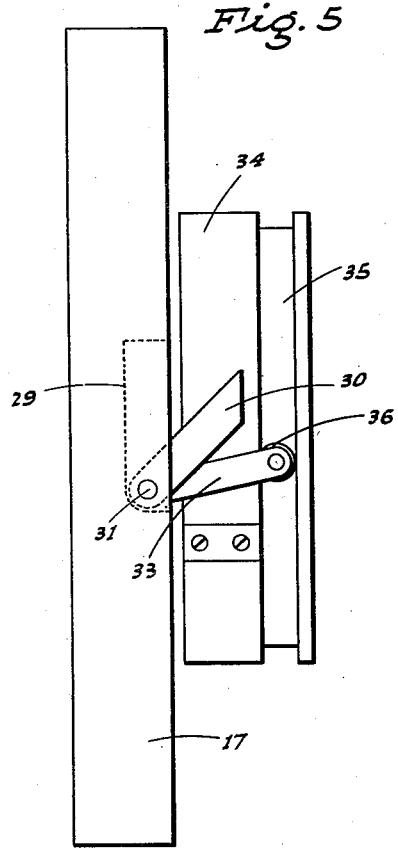
Fig. 5 is a similar view, but shows such vane in its advanced, working position.
Figure 6:
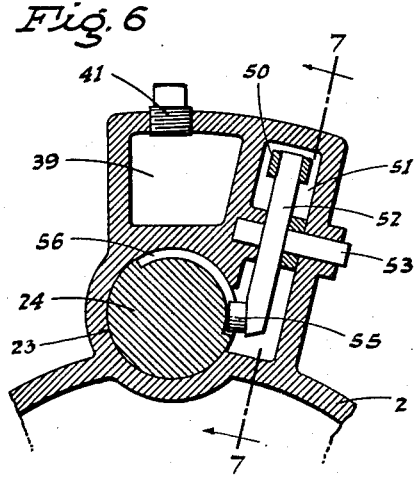
Fig. 6 is a fragmentary cross section on line 6—6 of Fig. 1.
Figure 7:
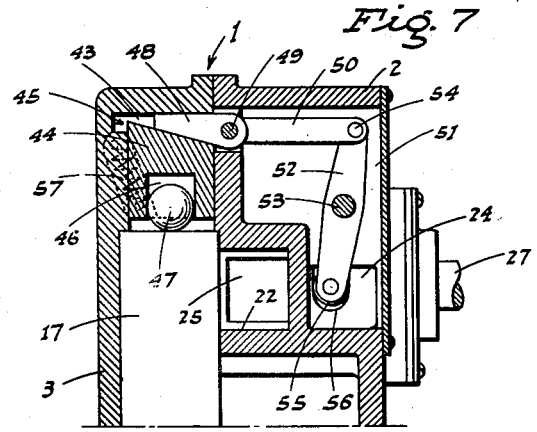
Fig. 7 is a fragmentary cross section on line 7—7 of Fig. 6.

At diametrally opposed points the rotor is formed, in the face which opens to the groove 22, with a pair of generally circumferentially extending, elongated notches 29, and an impeller vane 30 is mounted at one end by a pivot pin 31, in each slot for swinging from a retracted or out-of-the way position in the related notch, laterally outwardly to an advanced working position in the groove 22; these positions being shown in Figs. 4 and 5, respectively.

Upon travel of the rotor 17 in the fixed body unit 1, the impeller vanes 30 travel in the groove 22 throughout a major portion of its length. However, to clear the rotary plug valve 24, such impeller vanes 30 must be moved to their retracted position, as in Fig. 4, while passing said valve, and this is accomplished as follows:

The pivot pins 31 extend radially inwardly in the rotor 17 to an annular pocket or groove 32 opening laterally inwardly from said rotor; there being radial arms 33 fixed to the pivot pins 31 and projecting out of said pocket 32 in overhanging or lapping relation to the periphery of an annular cam body 34 fixed to the inner body section 2, and which cam body 34 is formed with a circumferential cam-way 35 in its periphery.

A roller 36 on the free end of each radial arm 33 runs in the cam-way 35; the latter being generated straight throughout its extent except for an undulation 37 at a predetermined point. With this arrangement the cam-way 35, acting on the rollers 36, normally maintains the impeller vanes 30 in their advanced working position projecting into the groove 22; the vanes then substantially matching in said groove with a running fit.

However, as each impeller vane 30 approaches the rotary plug valve 24, and which valve intersects the groove 22, the related roller 36 is worked by the undulation 37, whereby to cause said impeller vane to retract into its notch 29, remain therein while passing said plug valve 24, and to then be returned to working position in the groove 22.

Thus, the impeller vanes 30 normally run in the groove 22, saving and excepting their retraction to clear the rotary plug valve 24, followed by immediate advance or return to working position.

An annular, accordion-type seal 38 is secured to the radially innermost portion of the annular cam body 34 and has a pressure-tight but running fit with the rotor 17, as shown. A similar seal 38a runs against the rotor on the opposite side, and is mounted on disc 13.

The circular body unit 1 is filled, within the cavities thereof—including the groove 22—with hydraulic brake oil, which supply is maintained from a reservoir 39 by means of ducts 40, in the inner body section 2 and rotary plug valve 24, which register only when said plug valve 24 is in its normal position with the valve passage 25 open to the groove 22. The reservoir 39 includes a filler plug 41.

When the above described brake unit is in operation the impeller vanes 30 run free in the groove 22, pumping the oil ahead of said vanes and through the then open passage 25 of the rotary plug valve 24. Upon the stub shaft 27 being part-rotated by operation of the brake pedal actuated linkage of the vehicle, the plug valve 24 rotates to a corresponding extent, breaking the register of the ducts 40 and partially closing the valve passage 25. This immediately restricts the oil flow in the groove 22, causing a back pressure which retards movement of the impeller vanes 30 and produces a braking action on the rotor 17 and consequently on the vehicle wheel 14. Such braking action is proportionate to the degree of restriction of the valve passage 25 upon rotation of the plug valve 24; full braking action being attained when said valve passage 25 is entirely closed.

Figure 3:
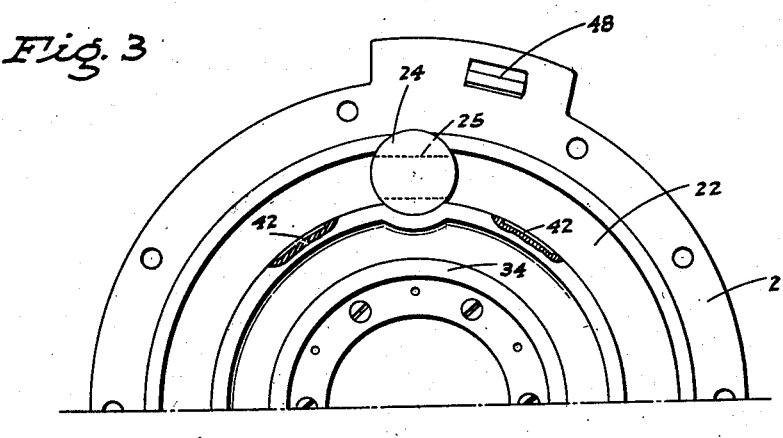
Fig. 3 is a fragmentary end elevation of the inner body section including the rotary valve, and the annular cam-body.

In order to prevent too great a pressure against the impeller vanes 30 as they immediately approach the plug valve 24, and as they swing from the groove 22 into the related notches 29 to clear said valve 24, the pressure is relieved by relatively short, longitudinal bypass channels 42 in the bottom of the groove 22 at points close to said valve 24, as shown in Fig. 3.

The brake unit, while functioning smoothly and without overheating, produces an effective, positive, and quick braking action, yet without undue wear and tear on the working parts of the unit, which working parts are wholly enclosed against the entry of foreign substance or moisture.

Upon full stopping of the vehicle, and at which time the relatively rotary parts of the brake unit become static and thus ineffective, it is desirable to lock such parts against rotation, and this is accomplished by the following holding brake or lock structure:

The outer body section 3 is formed, immediately adjacent the top thereof, with a circumferentially extending guide recess 43 of substantial radial depth, and a block 44 is engaged in said guide recess 43 for limited radial travel. The guide recess 43 opens to the periphery of the rotor 17, and between said periphery and the block 44 there is provided an opposed, overrunning ball clutch lock, indicated generally at 45; such lock including opposed taper notches 46 in the block 44, and steel balls 47 in said taper notches 46 in normally free-running engagement with the periphery of the rotor 17. The dimensioning of the parts is such that upon forceful displacement of the block 44 radially inwardly, one or the other of the balls 47, depending on the direction of rotation, will wedge or jam in the related taper notch 46, locking the rotor 17 with respect to the outer body section 3. This has the effect of locking up the entire brake unit against relative rotation of its parts, and which is necessary to prevent coasting or drifting as the vehicle is stopped.

The block 44 is forcefully urged radially inwardly, whereby to cause the above described holding brake or lock to work, upon the plug valve 24 being turned to a closed or full braking position, plus a slight further rotative motion. This is accomplished as follows:

A wedge 48 is engaged between the outer end of the block 44 and the adjacent portion of the body section 3, such wedge 48 extending generally parallel to the axis of the brake unit and being pivotally connected, as at 49, to a link 50 which extends into a cavity 51 in the inner body section 2. A rocking lever 52 is pivoted, as at 53, in the cavity 51 for swinging motion in the radial plane of sliding motion of the wedge 48; the related end of such rocking lever 52 being pivoted to the link 50, as at 54.

At its inner end the rocking lever 52 is fitted with a roller 55 which runs in a cam-way 56 formed in the rotary plug valve 24 axially outwardly of the valve passage 25. The cam-way 56 is generated in a form such that it normally holds the rocking lever 52 in a position with the wedge 48 retracted, and at which time the block 44 is urged outwardly to a non-working position by a spring 57.

Upon the brake unit being actuated by rotation of the rotary plug valve and by slight further rotation of said valve beyond a fully closed position, the cam-way 56 swings the rocking lever 52, through the medium of the roller 55, in a direction which advances the link 50 and drives the wedge 48 forcefully between the block 44 and the adjacent surface of the body section 3. When this occurs the block 44 is urged radially inwardly, whereupon the ball clutch lock 45 immediately acts in the manner previously described.

The lock normally releases when the footpedal is permitted to return to normal, at which time the rotary plug valve 24 turns back to its open position.

However, it is desired that this lock shall also serve as a parking brake, and to this end the conventional parking brake lever is connected by lost motion linkage, or the like (not shown) to another arm 28a on valve shaft 27, as shown in Fig. 1.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A self-contained hydraulic brake comprising a fixed body unit adapted to be secured to a mount, a rotor turnable in the body unit, a rotary part projecting axially out of the body unit from the rotor, working surfaces of the rotor and body unit running in engagement, there being an annular groove in one working surface of the body unit adapted to contain hydraulic brake fluid, a valve mounted in said groove to control fluid flow therein, means to actuate the valve from exteriorly of the body unit, a plurality of circumferentially spaced impeller vanes mounted on the rotor and normally retractibly projecting therefrom into the groove, and means between the body unit and vanes operative to retract the latter into said rotor to pass the valve.

2. A brake, as in claim 1, in which said last named means is operative to advance the impeller vanes to normal position in the groove after passing said valve.

3. A self-contained hydraulic brake comprising a fixed body unit adapted to be secured to a mount, a rotor turnable in the body unit, a rotary part projecting axially out of the body unit from the rotor, working surfaces of the rotor and body unit running in engagement, there being an annular groove in one working surface of the body unit adapted to contain hydraulic brake fluid, a valve mounted in said groove to control fluid flow therein, means to actuate the valve from exteriorly of the body unit, a plurality of circumferentially spaced impeller vanes mounted on the rotor and normally retractibly projecting therefrom into the groove, and cam actuated means operative to cause retraction of the impeller vanes to pass the valve and then advance the vanes to normal position in the groove.

4. A self-contained hydraulic brake comprising a fixed body unit adapted to be secured to a mount, a rotor turnable in the body unit, a rotary part projecting axially out of the body unit from the rotor, working surfaces of the rotor and body unit running in engagement, there being an annular groove in one working surface of the body unit adapted to contain hydraulic brake fluid, a valve mounted in said groove to control fluid flow therein, means to actuate the valve from exteriorly of the body unit, a plurality of circumferentially spaced impeller vanes mounted on the rotor and normally retractibly projecting therefrom into the groove, and means including a cam-way in the body unit and parts in connection with the vanes running in said cam-way operative to retract the vanes to pass the valve and then advance the vanes to normal position in the groove.

5. A self-contained hydraulic brake comprising a fixed body unit adapted to be secured to a mount, a rotor turnable in the body unit, a rotary part projecting axially out of the body unit from the rotor, working surfaces of the rotor and body unit running in engagement, there being an annular groove in one working surface of the body unit adapted to contain hydraulic brake fluid, a valve mounted in said groove to control flow therein, the valve being rotary and including a shaft projecting out of the body unit, a radial arm on the projecting portion of the shaft, a plurality of circumferentially spaced impeller vanes mounted on the rotor and normally retractibly projecting therefrom into the groove, and means between the body unit and vanes operative to retract the latter into said rotor to pass the valve.

6. A self-contained hydraulic brake comprising a fixed body unit adapted to be secured to a mount, a rotor turnable in the body unit, a rotary part projecting axially out of the body unit from the rotor, adjacent, radial working faces of the rotor and body unit running in engagement, there being an annular groove in the working face of the body unit concentric to the rotor axis, said groove being adapted to contain hydraulic brake fluid, a valve mounted in said groove to control fluid flow therein, means to actuate the valve from exteriorly of the body unit, a plurality of circumferentially spaced impeller vanes mounted on the rotor and normally retractibly projecting laterally therefrom into the groove, and means between the body unit and vanes operative to retract the latter into said rotor to pass the valve.

7. A self-contained hydraulic brake comprising a fixed body unit adapted to be secured to a mount, a rotor turnable in the body unit, a rotary part projecting axially out of the body unit from the rotor, adjacent, radial working faces of the rotor and body unit running in engagement, there being an annular groove in the working face of the body unit concentric to the rotor axis, said groove being adapted to contain hydraulic brake fluid, a valve mounted in said groove to control fluid flow therein, means to actuate the valve from exteriorly of the body unit, there being a plurality of circumferentially spaced notches in the working face of the rotor in register with said groove, impeller vanes pivotally mounted on the rotor and normally retractibly projecting laterally therefrom into the groove, the vanes being swingable into said notches, and cam actuated means operative to cause the vanes to swing from the groove into the notches to pass the valve.

8. A self-contained hydraulic brake comprising a fixed body unit adapted to be secured to a mount, a rotor turnable in the body unit, a rotary part projecting axially out of the body unit from the rotor, adjacent, radial working faces of the rotor and body unit running in engagement, there being an annular groove in the working face of the body unit concentric to the rotor axis, said groove being adapted to contain hydraulic brake fluid, there being a bore in the body unit intersecting the groove, a rotary plug valve mounted in said bore operative to regulate fluid flow in the groove, an axial shaft on the rotary plug valve projecting out of the body unit for actuation exteriorly of the latter, a plurality of circumferentially spaced impeller vanes mounted on the rotor and normally retractibly projecting therefrom into the groove, and means between the body unit and vanes operative to retract the latter into said rotor to pass the valve.

9. A self-contained hydraulic brake, as in claim 8, in which the plug valve includes a diametral passage therethrough, a reservoir on the body unit above the plug valve, and there being a duct having a part in the body unit and a part in the plug valve in register and communicating between the reservoir and passage but only when said valve is open.

10. A self-contained hydraulic brake comprising a fixed body unit adapted to be secured to a mount, a rotor turnable in the body unit, a rotary part projecting axially out of the body unit from the rotor, working surfaces of the rotor and body unit running in engagement, there being an annular groove in one working surface of the body unit adapted to contain hydraulic brake fluid, a valve mounted in said groove to control fluid flow therein, means to actuate the valve from exteriorly of the body unit, a plurality of circumferentially spaced impeller vanes mounted on the rotor and normally retractibly projecting therefrom into the groove, means between the body unit and vanes operative to retract the latter into said rotor to pass the valve, and means responsive to actuation of said valve operative to releasably lock the rotor to the body unit subsequent to full closure of said valve.

11. A self-contained hydraulic brake, as in claim 10, in which the valve is of rotary plug type, and said last named means includes a cam-way formed on the valve.

12. A self-contained hydraulic brake comprising a fixed body unit adapted to be secured to a mount, a rotor turnable in the body unit, a rotary part projecting axially out of the body unit from the rotor, adjacent, radial working faces of the rotor and body unit running in engagement, there being an annular groove in the working face of the body unit concentric to the rotor axis, said groove being adapted to contain hydraulic brake fluid, a valve mounted in said groove to control fluid flow therein, means to actuate the valve from exteriorly of the body unit, there being a plurality of circumferentially spaced notches in the working face of the rotor in register with said groove, impeller vanes pivotally mounted on the rotor and normally retractibly projecting laterally therefrom into the groove, the vanes being swingable into said notches about the axis of their pivots, the latter being pins extending radially into the rotor from the notches, the rotor having a pocket in which said pins terminate, radial arms on the pins projecting from the pocket, an annular cam fixed in the body unit concentric to its axis, and a cam engaging element on each arm; said cam being operative through said element, arms, and pins to cause the vanes to swing into the notches to pass the valve.

13. A self-contained hydraulic brake comprising a fixed body unit adapted to be secured to a mount, a rotor turnable in the body unit, a rotary part projecting axially out of the body unit from the rotor, working surfaces of the rotor and body unit running in engagement, there being an annular groove in one working surface of the body unit adapted to contain hydraulic brake fluid, a valve mounted in said groove to control fluid flow therein, means to actuate the valve from exteriorly of the body unit, a plurality of circumferentially spaced impeller vanes mounted on the rotor and normally retractibly projecting therefrom into the groove, means between the body unit and vanes operative to retract the latter into said rotor to pass the valve, and means responsive to actuation of said valve operative to releasably lock the rotor to the body unit subsequent to full closure of said valve; said last named means including an opposed normally overrunning ball clutch lock between the rotor and body unit adjacent the valve, said lock having a block shiftable radially inwardly to actuate the lock, the valve being of rotary plug type, and means to so shift the block in response to rotation of the plug valve at least to closed position.

14. A self-contained hydraulic brake, as in claim 13, in which said last named means includes a wedge movable between the block and an adjacent part of the body unit, there being a cam-way on the plug valve, and cam-way actuated linkage connected to said wedge.

ROY D. KISBEY.

REFERENCES CITED

The following references are of record in the file of this patent:

UNITED STATES PATENTS

| Number | Name | Date |
|---|---|---|
| 2,052,429 | Tyler | Aug. 25, 1936 |
| 2,105,712 | Welch et al. | Jan. 18, 1936 |